United States Patent [19]
Meyer

[11] 3,943,610
[45] Mar. 16, 1976

[54] ADAPTER FOR ATTACHING MOLDING OR THE LIKE

[75] Inventor: Engelbert A. Meyer, Bloomfield Hills, Mich.

[73] Assignee: USM Corporation, Boston, Mass.

[22] Filed: Oct. 3, 1974

[21] Appl. No.: 511,505

[52] U.S. Cl.................................. 24/73 HS; 52/718
[51] Int. Cl.². .................. A44B 21/00; E04F 19/02
[58] Field of Search ..... 24/259 R, 259 FS, 259 PW, 24/259 TF, 259 B, 73 B, 73 BP, 73 FT, 73 HS; 52/208, 718

[56] References Cited
UNITED STATES PATENTS

| | | | |
|---|---|---|---|
| 3,373,539 | 3/1968 | Meyer | 52/208 |
| 3,411,262 | 11/1968 | Meyer | 52/718 |
| 3,670,368 | 6/1972 | Meyer | 24/73 |

FOREIGN PATENTS OR APPLICATIONS

| | | | |
|---|---|---|---|
| 2,003,858 | 11/1969 | France | 24/259 PW |

*Primary Examiner*—Donald A. Griffin
*Attorney, Agent, or Firm*—Aubrey C. Brine; Vincent A. White; Richard B. Megley

[57] ABSTRACT

An adapter clip is provided for retaining a molding member adjacent a panel having an upstanding headed stud mounted thereon. The adapter has an inclined ramp with an opening therein for receiving the headed stud and the opening is formed by a linear guide surface for unidirectional movement of the adapter onto the stud. A cantilevered arm is torsionally flexed during application of the adapter to the stud, after which the arm returns to a position retaining the adapter on the stud.

3 Claims, 5 Drawing Figures

ADAPTER FOR ATTACHING MOLDING OR THE LIKE

BACKGROUND OF THE INVENTION

The present invention relates generally to an adapter type fastener for use in retaining a windshield glass and related molding onto an automobile panel having an upstanding headed stud fixed thereto. Particularly, the invention is directed to an adapter for use with a button headed stud of the type disclosed in U.S. Pat. No. 3,373,539, the stud having a shank with one end welded or adhesively fixed to a panel and the head spaced from the panel.

In Applicant's U.S. Pat. No. 3,373,539 there is disclosed a clip adapted to retain a structural member to a support member having a button extending from the surface of the support. The clip means disclosed has a body portion defining a U-shaped opening and a ramp portion extending from the body portion to an acuate angle and resiliently joined to the body portion within the U-shaped opening. The ramp portion was provided with a slot opening through one edge for receiving the shank of the button and a button seat adjacent the end of the ramp communicating with the slot.

In the above described construction the slot was restricted adjacent the opening to the button seat to cause the ramp portion to resiliently flex from the axis of the slot as the shank of the button was received therethrough. The button and clip when assembled, provided a structure wherein the button received on the button seat could not be removed simply by biasing the ramp portion toward the surface of the support.

While this structure in one application served to provide a novel means for retaining the molding attaching a windshield glass to an automobile panel, with the safety standards being put into effect by the automobile manufacturers, some autos were manufactured with socalled "pop out" windshields wherein the glass is to be dislodged from its position upon being struck with a predetermined force from the inside of the vehicle. These windshields are seated within a peripheral gasket of molded rubber rather than an adhesive such as polysulphides previously widely used. The trim molding which surrounds the glass of the windshield is retained in position by a series of buttons and adapters or clips, the buttons being fixed to the panel adjacent the windshield opening and the adapters being mounted on the button and retainably engaged with the marginal edges of the molding.

As discussed in Applicant's U.S. Pat. No. 3,670,368, tests made on the above described windshields tended to show that the force against the windshield sufficient to cause it to pop out, was in some cases sufficient to cause dislodgment of the above described clips.

In Applicant's U.S. Pat. No. 3,670,368 therefore there was disclosed an adapter for attaching a molding member to the panel having a headed button upstanding from the panel surface wherein the slot formed in the adapter was provided with an arcuately shaped wall portion adjacent the button seat to cam the button into engagement with the seat during assembly. While the structure served to solve the problem of dislodgement of the clips under a prescribed force sufficient to pop out a windshield, other problems, particularly in the assembly of these clips onto the button headed studs, have often occurred.

If, in assembly, proper attention is not paid to insuring that the shank of the stud is properly seated in the adapter with the edge of the slot seat into abutment against the shank of the stud, there is a possibility of only partially assembling the adapter to the stud, and the possibility that the adapter could be dislodged from the stud during use. Thus, the assembly of the adapter onto the stud requires an L, or angular type motion to properly seat the adapter onto the button head stud.

In order to provide this L or angular motion special tools may be designed to impart bidirectional motion to the adapter clip. However, this becomes costly and, while not necessary in some applications, it may be necessary in others to insure reliability of all the adapters being assembled properly.

In addition to the expense of providing a special tool to produce this L shaped motion, the time involved in utilizing a special tool, or in insuring the proper seating of the adapter onto the stud, may increase the time necessary to perform the specific assembly operation.

The present invention therefore has an object to provide an adapter of the type previously disclosed for attaching a molding member or the like to a panel surface having a button headed stud upstanding therefrom, which is effective to retain the fastener onto the headed stud when subjected to sufficient force to cause a "pop out" windshield to become dislodged.

Another object of the invention is to provide an adapter of the type mentioned above which is installed on a headed stud in a linear direction and therefore may be driven on by a single blow with a hammer or other similar device.

A further object of the invention is to provide an adapter of the type discussed above which is simple to employ and capable of reliable assembly onto the studs, from part to part.

SUMMARY OF THE INVENTION

These objects of the invention, and other objects which will be apparent as the description proceeds are achieved by providing an adapter which is suitable for retaining a molding member adjacent a panel wherein the panel has an upstanding headed stud mounted thereon. The adapter in general comprises a pair of spaced legs terminating at one of their ends in a connecting flange which has means for retaining the molding member and an upturned flange connecting the opposite ends of said legs. An inclined ramp portion is connected to the opposite ends of the legs at the upturned flange and extends between the legs toward the connecting flange, the ramp having an opening formed which extends into a portion of the upturned flange. A linear guide surface defines the opening at one side in said ramp and extends from the upturned flange toward the connecting flange. A torsionally resilient arm extends into the ramp opening cantilevered adjacent the lower portion of the upturned flange, the arm having a camming surface forming an angle with the guide surface and disposed in space relation with the guide surface. During movement of the adapter to cause the headed stud to enter the opening with the head overlying the ramp the stud is forced into contact with the guide surface, and the camming surface, and the arm is torsionally moved to provide space between the guide surface and the arm to permit entry of the stud into the ramp opening along a path parallel to the linear guide surface. With the adapter located on the stud, the arm returns to its initial position with a pressure surface contacting the shank of the stud to retain the adapter on the stud.

BRIEF DESCRIPTION OF THE DRAWING

For a more complete understanding of the invention, reference should be made to the following description taken in conjunction with the accompanying drawings wherein.

DESCRIPTION OF THE PREFERRED EMBODIMENTS

Figure 1:
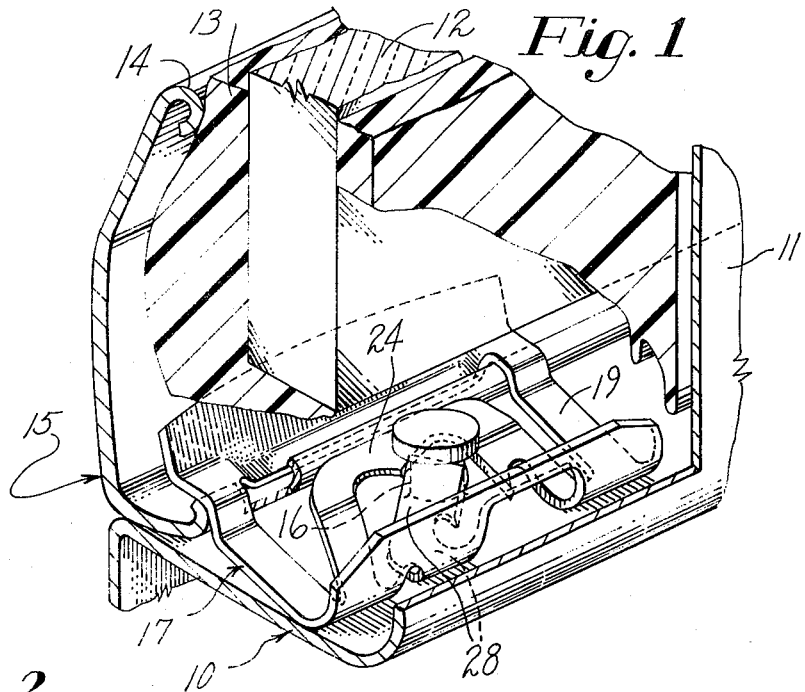
FIG. 1 is a sectional perspective view showing elements of the invention including an automobile panel adjacent the windshield.

Referring now to the drawings and in particular to FIG. 1, there is shown a typical automotive construction employing the adapter of the present invention in combination with a somewhat standard construction. An automobile panel 10 is so constructed that a pinch-weld flange 11 forms an opening into which a windshield glass 12 is to be mounted. The windshield glass 12 is enveloped at its lower edge by a rubber molding 13 which is disposed between the flange 11 and a flange 14 of a trim strip 15.

The automobile panel 10 is provided with a headed stud 16 for retaining the windshield glass 12 in place through use of a suitable adapter.

An adapter 17 when constructed in accordance with the teachings of the present invention is effective to retain the trim strip 15 in position with the flange 14 resiliently engaged with the rubber molding 13, the opposite side of the molding being engaged by the adapter.

It will be noted that the elements of construction described are broadly similar to those described in U.S. Pat. No. 3,670,368 assigned to the assignee of the subject invention; however, the adapter 17, which will be described in detail hereinafter, is considered to be an improvement over the adapter described in the previously patented construction, both in ease of attachment and holding capabilities.

Figure 2:
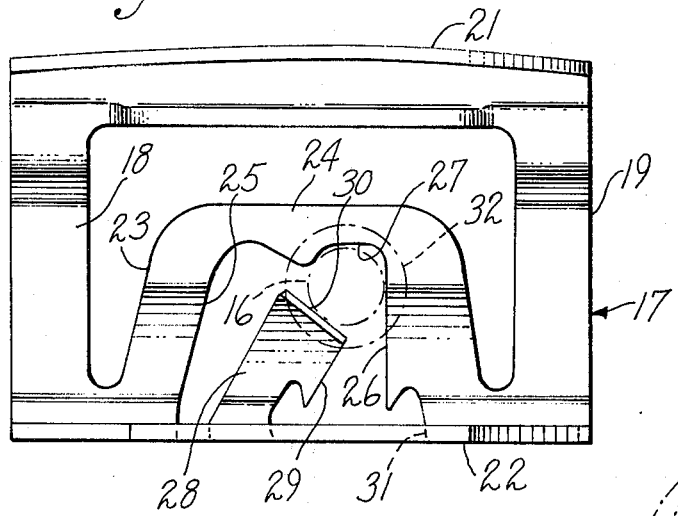
FIG. 2 is a plan view of the adapter of FIG. 1 showing details of the adapter.
Figure 4:
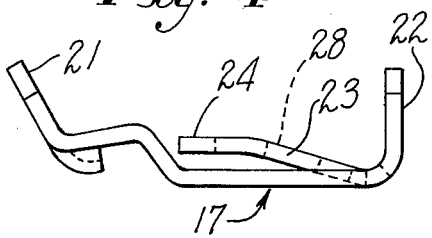
FIGS. 3 and 4 are elevational views of the adapter of FIGS. 1 and 2, showing further details of the invention.
Figure 3:
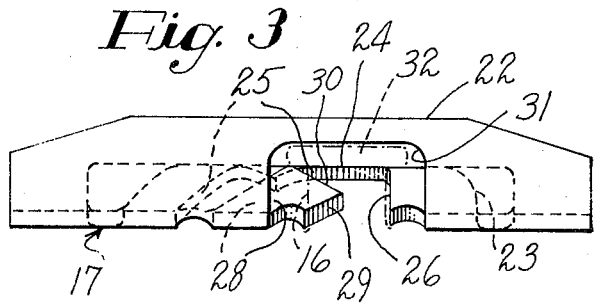

Referring now to FIGS. 2, 3 and 4, there is shown in detail the adapter 17 formed of spring steel material and which generally comprises a pair of parallel legs 18 and 19 which are connected at one end to a connecting flange 21. At the opposite ends of the legs 18 and 19, a second upturned flange portion 22 serves to connect the legs and support the other portions of the adapter 17.

Adjacent each of the legs 18 and 19 and extending from the lower portion of the flange 22 there is disposed an inclined ramp portion 23 which extends toward the connecting flange 21, between the legs 17 and 19. The distal end of the ramp portion 23 is provided with a surface 24 which is substantially parallel to the adjacent portions of the legs 18 and 19.

As best shown in FIG. 2, the inclined ramp portion 23 is provided with an opening 25 which extends from the lower portion of the flange portion 22 to the distal end of the ramp. One edge of an opening 24 is formed by a guide surface 26, generally parallel with the legs, and terminating in an elongated notch 27 which extends adjacent the surface 24.

A torsionally resilient arm 28 is mounted at the base of the flange portion 22 extending into the opening 25 in a direction generally toward the notch 27. The arm 28 comprises a camming surface 29 directed inwardly of the opening 25 toward the guide surface 26, and a pressure surface 30 generally facing the notch 27.

As best shown in FIG. 3, an aperture 31 is formed in the flange portion 22. The aperture 31 is, in general, provided directly opposite the notch 27 with the arm 28 extending therebetween and the guide surface 26 leading from the aperture 31 to the notch 27.

Figure 5:
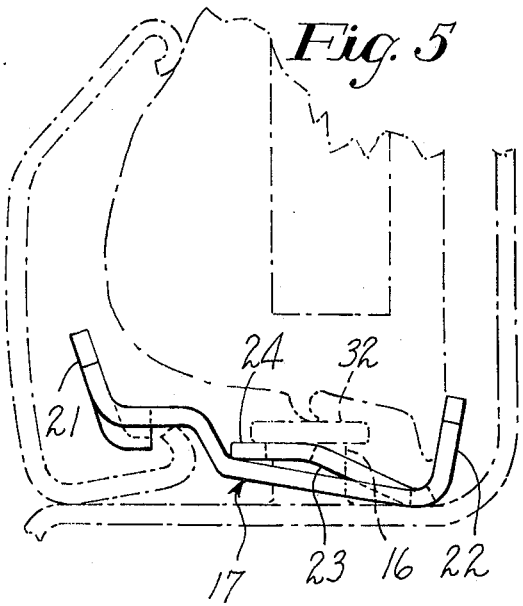
FIG. 5 is an elevational view of the adapter mounted on a button head fastener for retaining elements of an automobile windshield structure in place as in FIG. 1, the elements being shown in phantom lines.

In practice, the headed stud 16 is welded to the panel 10 with the shank normal to the panel as shown in FIGs. 1 and 5, a stud being provided for each adapter 17 deemed necessary to retain the structure in position.

To assemble the adapter 17 onto the stud 16, the adapter is placed to the left of the stud as shown in FIG. 5 and moved from left to right to the position shown in FIG. 5. As the adapter 17 is moved, the stud 16 including the button head 32 enters the aperture 31 and initially rests between the camming surface 29 and the guide surface 26. By further forcing the adapter 17 from left to right, the button head 32 engages the upper surface of the ramp portion 23 on its under surface and the camming surface 29 of the arm 28 forces the shank of the stud 16 against the guide surface 26. It will be noted that the spacing between the extremity of the arm 28 and the guide surface 26 has been so constructed as to be less than the diameter of the shank of the stud 16. Thus, that portion of the arm 28 which supports the arm at the flange 22 is of a thickness and width dimension as to allow torsional movement of the arm when the shank of the stud 16 is forced between the arm and the surface 26. Therefore, as the adapter 17 is moved from left to right the arm 28 twists such that the camming surface 29 is lifted and moved away from the surface 26 to allow the shank of the stud 16 to move into the notch 27. When the shank of the stud 16 is firmly into the notch 27, the resilience of the arm 28 permits it to snap back into a position wherein the pressure surface 30 is firmly in contact with the shank of the stud 16, and under the button 32.

The glass 12 and molding 13 are now put into position and the trim strip 15 is snapped into place with the upper flange 14 pressing against the molding, as shown in FIG. 1.

With the construction shown in FIG. 1 the contact between the surface 24 of the ramp portion 23 and the button 32 is effective to clamp the lower edge of the trim strip 15 in place while the trim strip retains the glass and molding in the proper position.

It will be noted that with the arm 28 positioned as shown in FIGS. 1, 2 and 5 in relation to the headed stud 16, an impact on the windshield 12 which causes a force in any direction on the adapter 17 will generally be insufficient to dislodge the adapter from the headed stud 16. Referring to FIG. 2, movement of the adapter 17 in a downward or leftward position, as shown in the Figure, would be resisted by the notch 27 or the surface 26. An upward or rightward movement of the adapter 17 as shown in FIG. 2 is firmly resisted by the surface 30 of the arm 28. This is facilitated by locating the pressure surface 30 such that it is in the area of 45° to the line of entry of the stud 16 into the notch 27, or relative to the guide surface 26. The various objectives of the invention are therefore achieved by providing an adapter 17 which provides locking in substantially all directions against movement when attached to a headed stud 16, and which requires force or motion in only one direction to assemble the adapter onto the stud.

I claim:

1. An adapter suitable for retaining a molding member adjacent a panel which has an upstanding headed stud mounted thereon, said adapter comprising a pair of spaced legs terminating at one of their ends in a connecting flange having means for retaining said molding member, an upturned flange connecting the opposite ends of said legs, an inclined ramp portion connected to the opposite ends of said legs at said upturned flange and extending between said legs toward said connecting flange, said inclined ramp having an opening formed thereon, which opening extends into a portion of said upturned flange, a unidirectional linear guide surface defining said opening in said ramp and extending from said upturned flange toward said connecting flange, said guide surface terminating at a notched portion forming said opening, a torsionally resilient arm extending into said ramp opening cantilevered adjacent the lower portion of said upturned flange, said arm having a camming surface forming an angle with said guide surface and disposed in spaced relation with said guide surface, and further having a pressure surface forming an angle of substantially 45° with said guide surface whereby during movement of said adapter to cause said headed stud to enter said opening with said head overlying said ramp said stud is forced into contact with said guide surface by said camming surface and said arm is torsionally moved to provide space between said guide surface and said arm to permit entry of said stud into said ramp opening along a path parallel to said linear guide surface, and said pressure surface contacting said stud under said stud head to retain said stud positioned adjacent said notched portion in said ramp opening.

2. The adapter of claim 1 wherein said guide surface is disposed substantially parallel to said legs.

3. The structure of claim 2 wherein said adapter is formed of a spring steel material.

* * * * *